United States Patent
Wen et al.

(10) Patent No.: US 11,955,663 B2
(45) Date of Patent: Apr. 9, 2024

(54) BATTERY MODULE AND ASSEMBLING METHOD THEREOF

(71) Applicant: CONTEMPORARY AMPEREX TECHNOLOGY CO., LIMITED, Ningde (CN)

(72) Inventors: Changjin Wen, Ningde (CN); Ye Xu, Ningde (CN); Anwei Wu, Ningde (CN); Guofeng Liu, Ningde (CN); Xiaorong Liu, Ningde (CN); Bin Zhao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 693 days.

(21) Appl. No.: 17/127,601

(22) Filed: Dec. 18, 2020

(65) Prior Publication Data
US 2021/0135318 A1    May 6, 2021

Related U.S. Application Data

(63) Continuation of application No. PCT/CN2019/117068, filed on Nov. 11, 2019.

(30) Foreign Application Priority Data

Nov. 19, 2018  (CN) .......................... 201821901615.1

(51) Int. Cl.
*H01M 50/503*    (2021.01)
*H01M 50/342*    (2021.01)
(Continued)

(52) U.S. Cl.
CPC ..... *H01M 50/503* (2021.01); *H01M 50/3425* (2021.01); *H01M 50/50* (2021.01);
(Continued)

(58) Field of Classification Search
CPC ............. H01M 50/503; H01M 50/507; H01M 50/3425; H01M 2200/20
See application file for complete search history.

(56) References Cited

U.S. PATENT DOCUMENTS

2010/0266887 A1   10/2010  Sekino et al.
2015/0140393 A1*  5/2015  Yamamoto .......... H01M 50/553
                                                429/121

FOREIGN PATENT DOCUMENTS

CN    101809786 A    8/2010
CN    104716289 A    6/2015
(Continued)

OTHER PUBLICATIONS

Contemporary Amperex Technology Co., Limited, International Search Report and Written Opinion, PCT/CN2019/117068, dated Feb. 10, 2020, 16 pgs.
(Continued)

*Primary Examiner* — Matthew J Merkling
(74) *Attorney, Agent, or Firm* — Kilpatrick Townsend & Stockton LLP

(57) ABSTRACT

This application provides a battery module and an assembling method thereof. The battery module includes batteries and busbar components. The batteries are arranged consecutively along a longitudinal direction of the battery module. Each battery includes a first electrode terminal and a second electrode terminal. The busbar components are connected to the batteries. The batteries include a first battery and a second battery. The first electrode terminal of the first battery and the first electrode terminal of the second battery are arranged along the longitudinal direction. The busbar components include a first busbar component, and the first busbar component includes a first part, a second part, and a third part.

16 Claims, 2 Drawing Sheets

(51) Int. Cl.
  *H01M 50/50*     (2021.01)
  *H01M 50/507*    (2021.01)
  *H01M 50/583*    (2021.01)
  *H01M 50/588*    (2021.01)
  *H01M 50/593*    (2021.01)
(52) U.S. Cl.
  CPC ....... *H01M 50/507* (2021.01); *H01M 50/583* (2021.01); *H01M 50/588* (2021.01); *H01M 50/593* (2021.01); *H01M 2200/20* (2013.01)

(56) References Cited

FOREIGN PATENT DOCUMENTS

| | | |
|---|---|---|
| CN | 107305938 A | 10/2017 |
| CN | 107507952 A | 12/2017 |
| CN | 209104250 U | 7/2019 |
| DE | 102012220584 A1 | 5/2014 |
| EP | 3644396 A1 * | 4/2020 |

OTHER PUBLICATIONS

Contemporary Amperex Technology Co., Limited, Extended European Search Report, EP19887099.0, dated Mar. 22, 2022, 8 pgs.

* cited by examiner

BATTERY MODULE AND ASSEMBLING METHOD THEREOF

CROSS-REFERENCE TO RELATED APPLICATIONS

This application is a continuation application of U.S. Patent Application No. PCT/CN2019/117068, filed on Nov. 11, 2019, which claims priority to Chinese Patent Application No. 201821901615.1, filed with the State Intellectual Property Office of the People's Republic of China on Nov. 19, 2018, all of which are incorporated herein by reference in their entirety.

TECHNICAL FIELD

This application relates to the field of batteries, and in particular, to a battery module and an assembling method thereof.

BACKGROUND

A battery module generally includes a plurality of batteries and a busbar component. The busbar component is connected to the plurality of batteries to implement electrical connection between the plurality of batteries. However, in the prior art, two output electrodes of the battery module are generally disposed at two opposite ends, thereby complicating a connection line between two battery modules, increasing a space occupied by the connection line, and affecting an energy density.

SUMMARY

In view of problems in background technologies, an objective of this application is to provide a battery module and an assembling method thereof to implement same-side output and exhaust and dissipate heat in time, thereby improving safety performance.

To achieve the above objective, this application provides a battery module including a plurality of batteries and a plurality of busbar components. The plurality of batteries are arranged consecutively along a longitudinal direction of the battery module. Each battery includes a first electrode terminal and a second electrode terminal. The plurality of busbar components are connected to the plurality of batteries. The plurality of batteries include a first battery and a second battery. The first electrode terminal of the first battery and the first electrode terminal of the second battery are laid out along the longitudinal direction. The plurality of busbar components include a first busbar component, and the first busbar component includes a first part, a second part, and a third part. The first part is connected to the first electrode terminal of the first battery, the second part is connected to the second electrode terminal of the second battery, and the third part connects the first part and the second part. A through hole is provided on the third part.

Each battery includes an explosion-proof valve. The explosion-proof valve is located between the first electrode terminal of the battery and the second electrode terminal. At least a part of the through hole is located above the explosive-proof valve.

The through hole is provided above the explosion-proof valve of the first battery and above the explosion-proof valve of the second battery.

There are a plurality of through holes.

The third part includes a first edge, and the first edge slants against the longitudinal direction and a transverse direction of the battery module. The through hole has a strip shape and extends along a direction parallel to the first edge.

The third part includes a plurality of fusing regions. The plurality of fusing regions are arranged along a direction perpendicular to the first edge. The through hole is disposed between two adjacent fusing regions. At least two fusing regions differ in width along the direction perpendicular to the first edge.

The plurality of fusing regions differ from each other in width along the direction perpendicular to the first edge. Exemplarily, the plurality of fusing regions have an increasing width along a direction away from the first edge. A cross-sectional area difference between two adjacent fusing regions is 5 mm$^2$ to 10 mm$^2$.

A width of the through hole along the direction perpendicular to the first edge is 1 mm to 5 mm; and a length of the through hole along a direction parallel to the first edge is 10 mm to 20 mm.

The plurality of batteries further include a third battery. The first battery, the second battery, and the third battery are arranged consecutively. The plurality of busbar components further include a second busbar component. The second busbar component connects the second electrode terminal of the first battery and the first electrode terminal of the third battery.

The second busbar component passes under the first busbar component and over the second battery. An insulating strip is provided between the second busbar component and the first busbar component.

The plurality of busbar components further include a plurality of third busbar components. Each third busbar component connects batteries that are spaced apart. The first busbar component, the second busbar component, and the plurality of third busbar components are electrically connected to the plurality of batteries.

The battery module further includes two output electrode plates that are respectively connected to the first electrode terminal and the second electrode terminal that serve as main output electrodes in the battery module. The two output electrode plates protrude from an end of the battery module that is further away from the first battery.

To achieve the above objective, this application further provides a method for assembling a battery module, including: arranging a plurality of batteries with a first electrode terminal and a second electrode terminal consecutively along a longitudinal direction; and connecting a plurality of busbar components to the electrode terminals of the plurality of batteries to electrically connect the plurality of electrode terminals. The plurality of batteries include a first battery and a second battery. The first electrode terminal of the first battery and the first electrode terminal of the second battery are arranged along the longitudinal direction. A through hole is disposed on a busbar component that connects the first electrode terminal of the first battery and the second electrode terminal of the second battery, and the through hole is located between the first electrode terminal of the first battery and the second electrode terminal of the second battery.

The method for assembling a battery module further includes: connecting two output electrode plates respectively to the first electrode terminal and the second electrode terminal that serve as main output electrodes in the battery module, and protruding the two output electrode plates from the same end of the battery module.

Beneficial effects of this application are as follows: by disposing the busbar components that extend slantingly, the two output electrode plates can protrude from the same end of the battery module to achieve the same-side output of the battery module and simplify a connection line between battery modules. The through hole makes upper and lower spaces of the third part communicate. Therefore, heat between the third part and the battery can be dissipated outward by the through hole, thereby avoiding heat accumulation, preventing overtemperature of the battery, and ensuring battery performance. In a case of short circuit of the first battery or the second battery, generated gas can be exhausted in time by the through hole after bursting the explosion-proof valve, thereby reducing safety risks. In addition, the through hole can also reduce a cross-sectional area of the third part. Therefore, in a case of short circuit of the battery, a current in the third part increases sharply, and the third part can generate heat and fuse under the effect of the current, thereby cutting off a circuit and avoiding safety accidents.

REFERENCE NUMERALS ARE AS FOLLOWS

Figure 1:
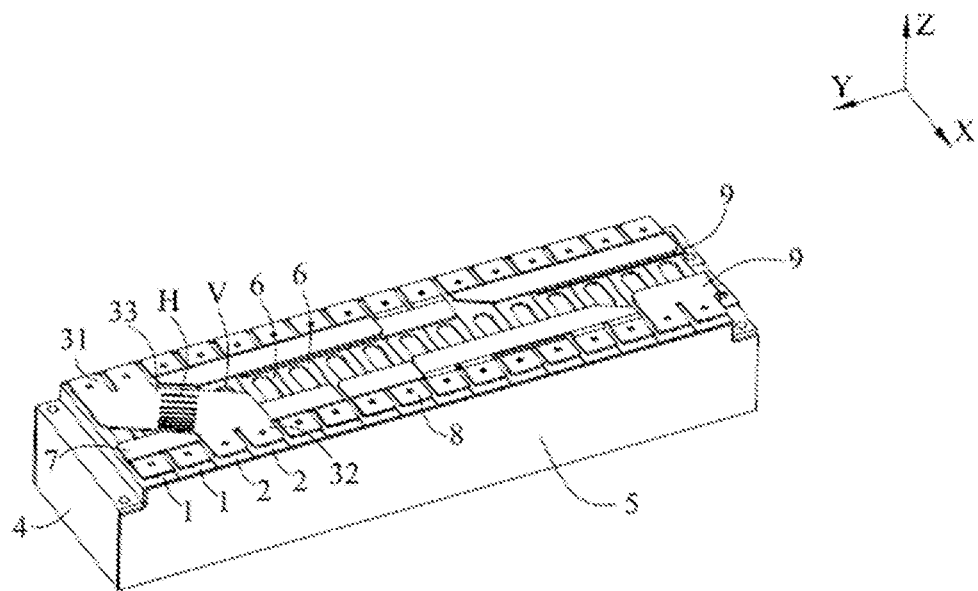
FIG. 1 is a schematic diagram of a battery module according to this application.

1: First battery;
2: Second battery;
3: First busbar component;
31: First part;
32: Second part;
33: Third part;
331: First edge;
332: Second edge;
333: Fusing region;
4: End plate;
5: Side plate;
6: Third battery;
7: Second busbar component;
8: Third busbar component;
9: Output electrode plate;
H: Through hole;
V: Explosion-proof valve;
T1: First electrode terminal;
T2: Second electrode terminal;
X: Transverse direction;
Y: Longitudinal direction; and
Z: Height direction

DESCRIPTION OF EMBODIMENTS

To make the objectives, technical solutions, and advantages of this application clearer, the following describes this application in further detail with reference to accompanying drawings and embodiments. Understandably, the specific embodiments described herein are merely intended to explain this application, but are not intended to limit this application.

In the description of this application, unless otherwise expressly specified, the terms "first", "second", and "third" are for the sole purpose of description rather than indicating or implying any order of preference; the term "a plurality of" means two or more; unless otherwise expressly specified, the terms such as "connect" and "fix" shall be understood in a broad sense. For example, a "connection" may be a fixed connection, or a detachable connection, or an integrated connection, or an electrical connection or signal connection; or may be a direct connection or an indirect connection implemented through an intermediate medium. A person of ordinary skill in the art can understand the specific meanings of the terms in this application according to the context.

Understandably, in the description of this application, localizers such as "on", "above", "under", and "below" described in the embodiments of this application are described from a perspective shown in the drawings, and shall not be understood as a limitation on the embodiments of this application. In addition, understandably, depending on the context, one element described as being connected "on" or "under" another element not only means that the element may be directly connected "on" or "under" the other element, but also means that the element may be indirectly connected "on" or "under" the other element through an intermediate element. The following describes this application in further detail with reference to specific embodiments and accompanying drawings.

Figure 2:
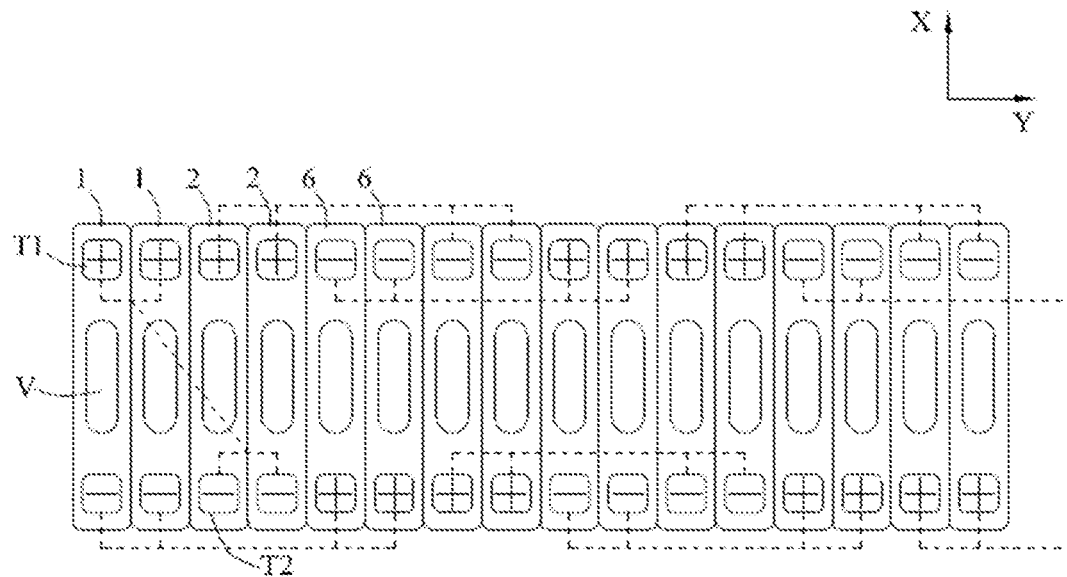
FIG. 2 is a schematic connection diagram of batteries in a battery module according to this application.

Referring to FIG. 1 and FIG. 2, a battery module in this application includes batteries, busbar components, end plates 4, and side plates 5.

The batteries may be prismatic lithium-ion batteries, and the batteries are plural in number and arranged consecutively along a longitudinal direction Y of the battery module. Each battery includes two opposite-polarity electrode terminals at the top of the battery, that is, includes a first electrode terminal T1 and a second electrode terminal T2. The first electrode terminal T1 and the second electrode terminal T2 are arranged along a transverse direction X. Each battery further includes an explosion-proof valve V at the top. The explosion-proof valve V is located between the first electrode terminal T1 and the second electrode terminal T2.

In a case of short circuit of the battery, gas is generated inside the battery rapidly. When an air pressure reaches a specific level, the gas can burst the explosion-proof valve V and exhaust out of the battery, thereby preventing the battery from explosion.

There are two end plates 4 that are respectively disposed at two ends of the plurality of batteries along the longitudinal direction Y. There are two side plates 5 that are respectively disposed on two sides of the plurality of batteries along the transverse direction X. The end plates 4 and the side plates 5 are welded together to form a rectangular frame. The plurality of batteries may be fixed to the frame by bonding or by other means.

The busbar components are plural in number and connected to the plurality of batteries. Each busbar component is connected to the electrode terminals of the batteries, so as to connect the plurality of batteries together in a serial, parallel, or serial-parallel manner.

The plurality of batteries include a first battery 1 and a second battery 2. The first electrode terminal T1 of the first battery 1 and the first electrode terminal T1 of the second battery 2 are arranged along the longitudinal direction Y. In other words, in the longitudinal direction Y, the first electrode terminal T1 of the first battery 1 is flush with the first electrode terminal T1 of the second battery 2, and the second electrode terminal T2 of the first battery 1 is flush with the second electrode terminal T2 of the second battery 2.

The plurality of busbar components include a first busbar component 3. The first busbar component 3 includes a first part 31, a second part 32, and a third part 33. The first part 31 is connected to the first electrode terminal T1 of the first battery 1, the second part 32 is connected to the second electrode terminal T2 of the second battery 2, and the third part 33 connects the first part 31 and the second part 32. The first busbar component 3 serially connects the first battery 1 and the second battery 2. The first busbar component 3 is an integrated metal component.

A quantity of the first batteries 1 and a quantity of the second batteries 2 may be set as required. For example, in an embodiment, referring to FIG. 2, there are two first batteries 1 and two second batteries 2. The first part 31 is connected to the first electrode terminals T1 of the two first batteries 1, thereby parallel-connecting the two first batteries 1. The second part 32 is connected to the second electrode terminals T2 of the two second batteries 2, thereby parallel-connecting the two second batteries 2. The first busbar component 3 connects the four batteries in a serial-parallel manner. Certainly, there may also be one or three first batteries 1 and one or three second batteries 2.

A quantity of the first parts 31 may be the same as a quantity of the first batteries 1, and a quantity of the second parts 32 may be the same as a quantity of the second batteries 2.

The plurality of batteries further include a third battery 6. The first battery 1, the second battery 2, and the third battery 6 are arranged consecutively. The plurality of busbar components further include a second busbar component 7. The second busbar component 7 connects the second electrode terminal T2 of the first battery 1 and the first electrode terminal T1 of the third battery 6, thereby serial-connecting the first battery 1 and the third battery 6. The second busbar component 7 may pass under the first busbar component 3 and over the second battery 2. An insulating strip may be disposed between the second busbar component 7 and the first busbar component 3 to avoid conductivity between the two busbar components.

The plurality of busbar components further include a plurality of third busbar components 8. Each third busbar component 8 connects batteries that are spaced apart (for example, connects the second battery 2 and a fourth battery, or connects the third battery 6 and a fifth battery, or the like). The first busbar component 3, the second busbar component 7, and the third busbar components 8 connect all batteries together.

The battery module further includes two output electrode plates 9 that are respectively connected to the first electrode terminal T1 and the second electrode terminal T2 that serve as main output electrodes in the battery module. Two battery modules may be electrically connected by the output electrode plates 9. The two output electrode plates 9 may protrude from an end of the battery module that is further away from the first battery 1.

In summary, by disposing the first busbar component 3 that extends slantingly, this application can protrude the two output electrode plates 9 from the same end of the battery module to achieve the same-side output of the battery module and simplify a connection line between battery modules.

However, in order for the two output electrode plates 9 to protrude from the same end of the battery module, the first electrode terminal T1 of the first battery 1 is unable to be flush with the second electrode terminal T2 of the second battery 2 along the longitudinal direction Y. That is, the first electrode terminal T1 of the first battery 1 is staggered against the second electrode terminal T2 of the second battery 2. In order to connect the first electrode terminal T1 and the second electrode terminal T2 that are staggered, the third part 33 of the first busbar component 3 needs to extend between the first electrode terminal T1 and the second electrode terminal T2. Consequently, the third part 33 covers the explosion-proof valve V. In a case of short circuit of the first battery 1 or the second battery 2, the generated gas may be blocked by the third part 33 after bursting the explosion-proof valve V, and cannot be exhausted and depressurized at an earliest possible time, resulting in safety hazards.

Therefore, in some embodiments, a through hole H is disposed on the third part 33. The through hole H makes upper and lower spaces of the third part 33 communicate. Therefore, heat between the third part 33 and the battery can be dissipated outward by the through hole H, thereby avoiding heat accumulation, preventing overtemperature of the battery, and ensuring battery performance. In a case of short circuit of the first battery 1 or the second battery 2, generated gas can be exhausted in time by the through hole H after bursting the explosion-proof valve V, thereby reducing safety risks. In addition, the through hole H can also reduce a cross-sectional area of the third part 33. Therefore, in a case of short circuit of the battery, a current in the third part 33 increases sharply, and the third part 33 can generate heat and fuse under the effect of the current, thereby cutting off a circuit and avoiding safety accidents.

The generated gas erupts upward after bursting the explosion-proof valve V. Therefore, in some embodiments, at least a part of the through hole H is located right above the explosion-proof valve (V). In this way, the generated gas can directly pass through the through hole H, thereby increasing gas exhausting speed and reducing safety risks.

The third part 33 may fully cover some explosion-proof valves V. Therefore, the through hole H needs to be disposed above all explosion-proof valves V that are fully covered by the third part 33. Exemplarily, the through hole H is disposed above the explosion-proof valve V of the first battery 1 and above the explosion-proof valve V of the second battery 2. In this case, in a case of short circuit of any battery, the generated gas can be exhausted in time after bursting the explosion-proof valve V.

There are a plurality of through holes H. The plurality of through holes H can improve gas exhausting efficiency and safety of the battery module. In addition, the plurality of through holes H can also increase a surface area of the third part 33 and improve heat dissipation efficiency. In a case of thermal runaway in the battery, the gas generated inside the battery bursts the explosion-proof valve V, and the generated gas may carry some high-temperature solid particles. In this application, the plurality of through holes H serve functions of shunting and interception to some extent, and can reduce an impact caused by the high-temperature solid particles onto other components (such as a harness plate above the busbar component) of the battery module and improve safety of the battery module.

Because the first electrode terminal T1 of the first battery 1 is staggered against the second electrode terminal T2 of the second battery 2, the third part 33 needs to extend along a direction slanting against the longitudinal direction Y and the transverse direction X. In other words, at least a part of the third part 33 is a slanting region. The slanting region slants against the longitudinal direction Y and the transverse direction X.

Figure 3:
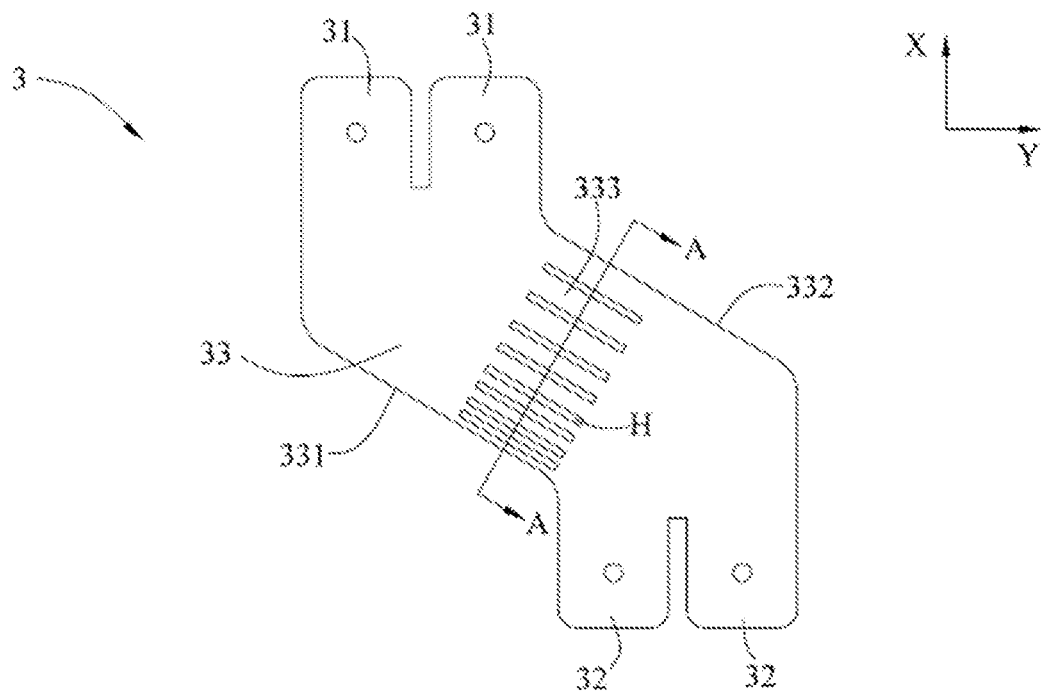
FIG. 3 is a schematic diagram of a first busbar component in FIG. 1.
Figure 4:
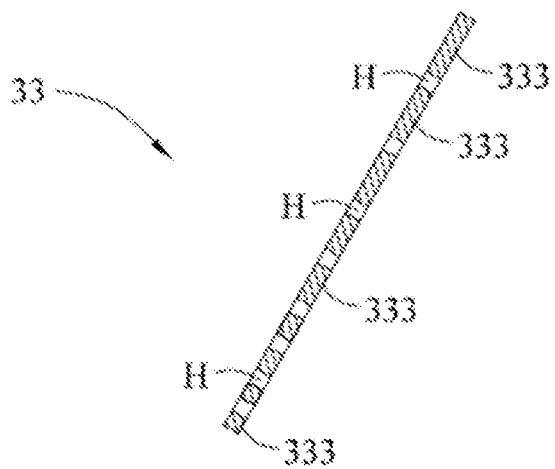
FIG. 4 is a sectional drawing of FIG. 3 along an A-A line.

Referring to FIG. 3, the third part 33 includes a first edge 331 and a second edge 332. The first edge 331 and the second edge 332 are located at two opposite ends of the slanting region of the third part 33 respectively. Correspondingly, the first edge 331 slants against the longitudinal direction Y and the transverse direction X.

A flow capacity of the third part 33 depends on a minimum distance between the first edge 331 and the second edge 332. Therefore, in a case that the second edge 332 is parallel to the first edge 331, effective utilization of the third part 33 is maximized. A bulge may be disposed on the second edge 332 so as to be connected to a sampling line of the battery module.

The through hole H has a strip shape and extends along a direction parallel to the first edge 331. In a case that the through hole H is parallel to the first edge 331, an impact caused by the through hole H onto an effective flow area of the third part 33 is minimized, and the flow capacity is ensured.

The third part 33 includes a plurality of fusing regions 333. The plurality of fusing regions 333 are arranged along a direction perpendicular to the first edge 331. The through hole H is disposed between two adjacent fusing regions 333. In other words, with the plurality of through holes H, a plurality of strip-shaped fusing regions 333 spaced apart are formed on the third part 33.

At least two fusing regions 333 differ in width along the direction perpendicular to the first edge 331. Because the third part 33 is an equal-thickness metal plate, the flow area (that is, the area of a cross section perpendicular to the first edge 331) differs between two fusing regions 333 in a case that widths of the two fusing regions 333 are different.

With a smaller flow area of the fusing region 333, a higher resistance will result, a larger quantity of heat will be generated by a current, the fusing region is more likely to fuse. In a case of short circuit of the battery module, the current on the third part 33 will exceed a rated current. In this case, a fusing zone 333 with the smallest flow area will fuse first, and then the current on other fusing regions 333 will further increase, thereby increasing fusing speed of other fusing regions 333. In other words, by configuring fusing regions 333 of different widths, this application can increase the fusing speed of the fusing regions 333 to cut off the circuit in time and reduce safety hazards.

Exemplarily, the plurality of fusing regions 333 differ from each other in width along the direction perpendicular to the first edge 331, thereby maximizing the fusing speed of the fusing regions 333.

The plurality of fusing regions 333 have an increasing width along a direction away from the first edge 331. In punching the through hole H, a feed quantity may be gradually increased to facilitate forming.

A cross-sectional area difference between two adjacent fusing regions 333 is 5 mm$^2$ to 10 mm$^2$. If the cross-sectional area difference is less than 5 mm$^2$, heat required for fusing differs scarcely between the two fusing regions 333, and the effect of consecutive fusing may be hardly achievable. If the cross-sectional area difference is greater than 10 mm$^2$, heat required for fusing differs greatly between the two fusing regions 333, a fusing time difference between the two fusing regions 333 is great, and the fusing speed is affected.

A width of the through hole H along the direction perpendicular to the first edge 331 is 1 mm to 5 mm. If the width of the through hole H is less than 1 mm, ventilation of the through hole H is poor, and the gas exhausting speed is affected. If the width of the through hole H is greater than 5 mm, the flow capacity of the third part 33 will be affected drastically.

A length of the through hole H along a direction parallel to the first edge 331 is 10 mm to 20 mm. If the length is less than 10 mm, ventilation of the through hole H is poor, and the gas exhausting speed is affected. If the length is greater than 20 mm, overall strength of the third part 33 will be reduced.

What is claimed is:

1. A battery module, comprising a plurality of batteries and a plurality of busbar components, wherein
    the plurality of batteries are arranged consecutively along a longitudinal direction of the battery module, and each battery comprises a first electrode terminal and a second electrode terminal;
    the plurality of busbar components are connected to the plurality of batteries;
    the plurality of batteries comprise a first battery and a second battery, and the first electrode terminal of the first battery and the first electrode terminal of the second battery are arranged along the longitudinal direction;
    the plurality of busbar components comprise a first busbar component, and the first busbar component comprises a first part, a second part, and a third part;
    the first part is connected to the first electrode terminal of the first battery, the second part is connected to the second electrode terminal of the second battery, and the third part connects the first part and the second part; and
    a through hole is provided on the third part; and the third part comprises a first edge, and the first edge slants against the longitudinal direction and a transverse direction of the battery module; and
    the through hole has a strip shape and extends along a direction parallel to the first edge.

2. The battery module according to claim 1, wherein
    each battery comprises an explosion-proof valve, the explosion-proof valve is located between the first electrode terminal and the second electrode terminal of the battery; and
    at least a part of the through hole is located above the explosion-proof valve.

3. The battery module according to claim 2, wherein the through hole is provided above the explosion-proof valve of the first battery and above the explosion-proof valve of the second battery.

4. The battery module according to claim 1, wherein there are a plurality of through holes.

5. The battery module according to claim 1, wherein
    the third part comprises a plurality of fusing regions, and the plurality of fusing regions are arranged along a direction perpendicular to the first edge;
    the through hole is disposed between two adjacent fusing regions; and
    at least two fusing regions differ in width along the direction perpendicular to the first edge.

6. The battery module according to claim 5, wherein the plurality of fusing regions differ in width along the direction perpendicular to the first edge.

7. The battery module according to claim 5, wherein the plurality of fusing regions have an increasing width along a direction away from the first edge.

8. The battery module according to claim 7, wherein a cross-sectional area difference between two adjacent fusing regions is 5 mm$^2$ to 10 mm$^2$.

9. The battery module according to claim 1, wherein
    a width of the through hole along a direction perpendicular to the first edge is 1 mm to 5 mm; and a length of the through hole along a direction parallel to the first edge is 10 mm to 20 mm.

10. The battery module according to claim 1, wherein
the plurality of batteries further comprise a third battery, and the first battery, the second battery, and the third battery are arranged consecutively; and
the plurality of busbar components further comprise a second busbar component, and the second busbar component connects the second electrode terminal of the first battery and the first electrode terminal of the third battery.

11. The battery module according to claim 10, wherein the second busbar component passes under the first busbar component and over the second battery.

12. The battery module according to claim 11, wherein an insulating strip is provided between the second busbar component and the first busbar component.

13. The battery module according to claim 10, wherein
the plurality of busbar components further comprise a plurality of third busbar components, and each third busbar component connects batteries that are spaced apart; and
the first busbar component, the second busbar component, and the plurality of third busbar components are electrically connected to the plurality of batteries.

14. The battery module according to claim 1, wherein
the battery module further comprises two output electrode plates that are respectively connected to the first electrode terminal and the second electrode terminal that serve as main output electrodes of the battery module; and
the two output electrode plates protrude from an end of the battery module that is further away from the first battery.

15. A method for assembling a battery module, comprising:
arranging a plurality of batteries with a first electrode terminal and a second electrode terminal consecutively along a longitudinal direction of the battery module; and
connecting a plurality of busbar components to the electrode terminals of the plurality of batteries;
wherein the plurality of batteries comprise a first battery and a second battery, and the first electrode terminal of the first battery and the first electrode terminal of the second battery are arranged along the longitudinal direction; and
a through hole is provided on a busbar component that connects the first electrode terminal of the first battery and the second electrode terminal of the second battery, and the through hole is located between the first electrode terminal of the first battery and the second electrode terminal of the second battery; and wherein,
the third part comprises a first edge, and the first edge slants against the longitudinal direction and a transverse direction of the battery module; and
the through hole has a strip shape and extends along a direction parallel to the first edge.

16. The method for assembling a battery module according to claim 15, further comprising:
connecting two output electrode plates respectively to the first electrode terminal and the second electrode terminal that serve as main output electrodes in the battery module, and protruding the two output electrode plates from an end of the battery module that is further away from the first battery.

* * * * *